(12) United States Patent
Benvenuti

(10) Patent No.: US 7,810,491 B2
(45) Date of Patent: Oct. 12, 2010

(54) EVACUABLE FLAT PANEL SOLAR COLLECTOR

(75) Inventor: Cristoforo Benvenuti, Moens (FR)

(73) Assignee: European Organization for Nuclear Research-CERN, Geneva (CH)

( * ) Notice: Subject to any disclaimer, the term of this patent is extended or adjusted under 35 U.S.C. 154(b) by 27 days.

(21) Appl. No.: 10/569,042

(22) PCT Filed: Jan. 22, 2004

(86) PCT No.: PCT/EP2004/000503

§ 371 (c)(1),
(2), (4) Date: Aug. 23, 2006

(87) PCT Pub. No.: WO2005/075900

PCT Pub. Date: Aug. 18, 2005

(65) Prior Publication Data

US 2007/0039611 A1    Feb. 22, 2007

(51) Int. Cl.
*F24J 2/05* (2006.01)
*F24J 2/00* (2006.01)
*F24J 2/50* (2006.01)

(52) U.S. Cl. .................. 126/653; 126/655; 126/661; 126/908

(58) Field of Classification Search .............. 126/653, 126/655, 661, 708, 908; 228/121, 122.1
See application file for complete search history.

(56) References Cited

U.S. PATENT DOCUMENTS

| | | | | |
|---|---|---|---|---|
| 1,970,105 A | * | 8/1934 | Smith | ...................... 29/890.07 |
| 2,283,253 A | * | 5/1942 | Haven | ......................... 118/63 |
| 2,336,544 A | * | 12/1943 | Hopfield | ..................... 228/188 |
| 2,390,890 A | * | 12/1945 | MacFarland | ............. 228/179.1 |
| 2,566,327 A | * | 9/1951 | Hallock | ......................... 34/80 |
| 2,569,058 A | * | 9/1951 | Hobbs | ......................... 148/526 |
| 2,589,064 A | * | 3/1952 | Drake | ......................... 52/786.1 |
| 2,848,802 A | * | 8/1958 | Luks | ......................... 228/121 |
| 3,203,085 A | * | 8/1965 | Turner | ......................... 228/164 |
| 3,210,459 A | * | 10/1965 | Marciuko et al. | ........... 174/539 |
| 3,537,944 A | * | 11/1970 | Berning et al. | ................ 428/34 |
| 3,907,585 A | * | 9/1975 | Francel et al. | ................ 501/15 |
| 3,916,871 A | | 11/1975 | Estes et al. | |
| 3,960,136 A | | 6/1976 | Moan et al. | |

(Continued)

FOREIGN PATENT DOCUMENTS

DE            27 12 153         9/1978

(Continued)

*Primary Examiner*—Carl D Price
(74) *Attorney, Agent, or Firm*—Schiff Hardin LLP

(57) ABSTRACT

In a flat panel solar collector adapted to be evacuable and vacuum-tight, at least one absorber is provided. At least one conduit is provided which is at least partially thermally associated with the at least one absorber. A holding structure is provided comprising a perimetric frame. At least one first transparent wall is provided, the first transparent wall and the holding structure having a overlapping area. At least one side of the first transparent wall comprises at least partially at said overlapping area a metal coating forming at least one metallized area on the transparent wall. A first soft metal ribbon is provided sealing the junction between the first transparent wall and the holding structure and which is soldered to the holding structure and to the metallized area of the first transparent wall.

29 Claims, 6 Drawing Sheets

U.S. PATENT DOCUMENTS

| | | | | |
|---|---|---|---|---|
| 3,995,615 | A | * | 12/1976 | Hojnowski .................. 126/670 |
| 4,002,160 | A | | 1/1977 | Mather, Jr. |
| 4,011,855 | A | * | 3/1977 | Eshelman .................. 126/660 |
| 4,038,965 | A | * | 8/1977 | Lyon .......................... 126/654 |
| 4,084,576 | A | | 4/1978 | Pei |
| 4,132,218 | A | * | 1/1979 | Bennett ...................... 126/704 |
| 4,144,875 | A | * | 3/1979 | Bruno et al. ................ 126/662 |
| 4,224,927 | A | * | 9/1980 | Patil ........................... 126/675 |
| 4,289,113 | A | * | 9/1981 | Whittemore ................ 126/570 |
| 4,306,543 | A | * | 12/1981 | Doevenspeck et al. ...... 126/638 |
| 4,332,241 | A | * | 6/1982 | Dalstein et al. ............. 126/711 |
| 4,455,998 | A | | 6/1984 | Kroontje et al. |
| 4,579,107 | A | | 4/1986 | Deakin |
| 5,005,557 | A | * | 4/1991 | Bachli ........................ 126/572 |
| 5,653,222 | A | * | 8/1997 | Newman .................... 126/653 |
| 2005/0224827 | A1 | * | 10/2005 | Mund et al. .................. 257/99 |

FOREIGN PATENT DOCUMENTS

| | | |
|---|---|---|
| DE | 30 00 783 | 7/1981 |
| DE | 31 27 153 | 1/1983 |
| FR | 2 525 314 | 10/1983 |
| WO | WO 87/03327 | 6/1987 |

* cited by examiner

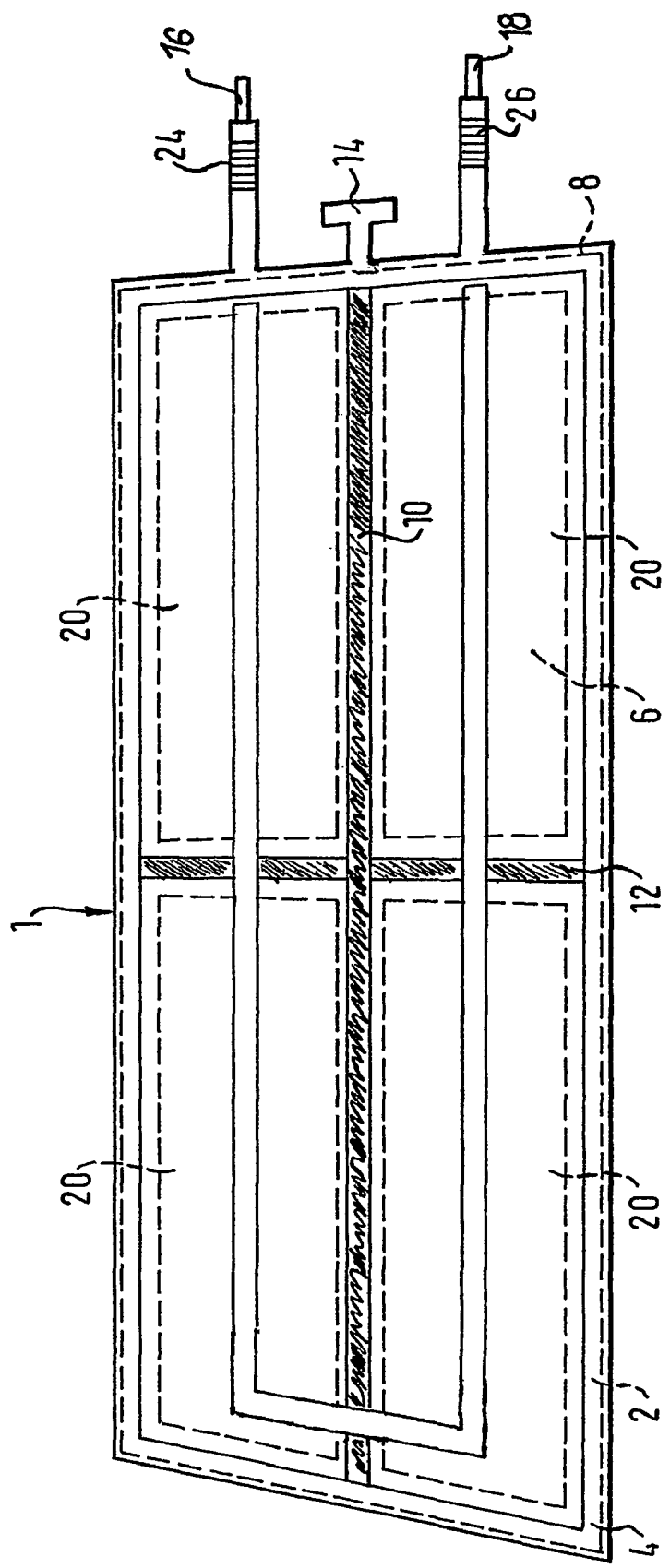

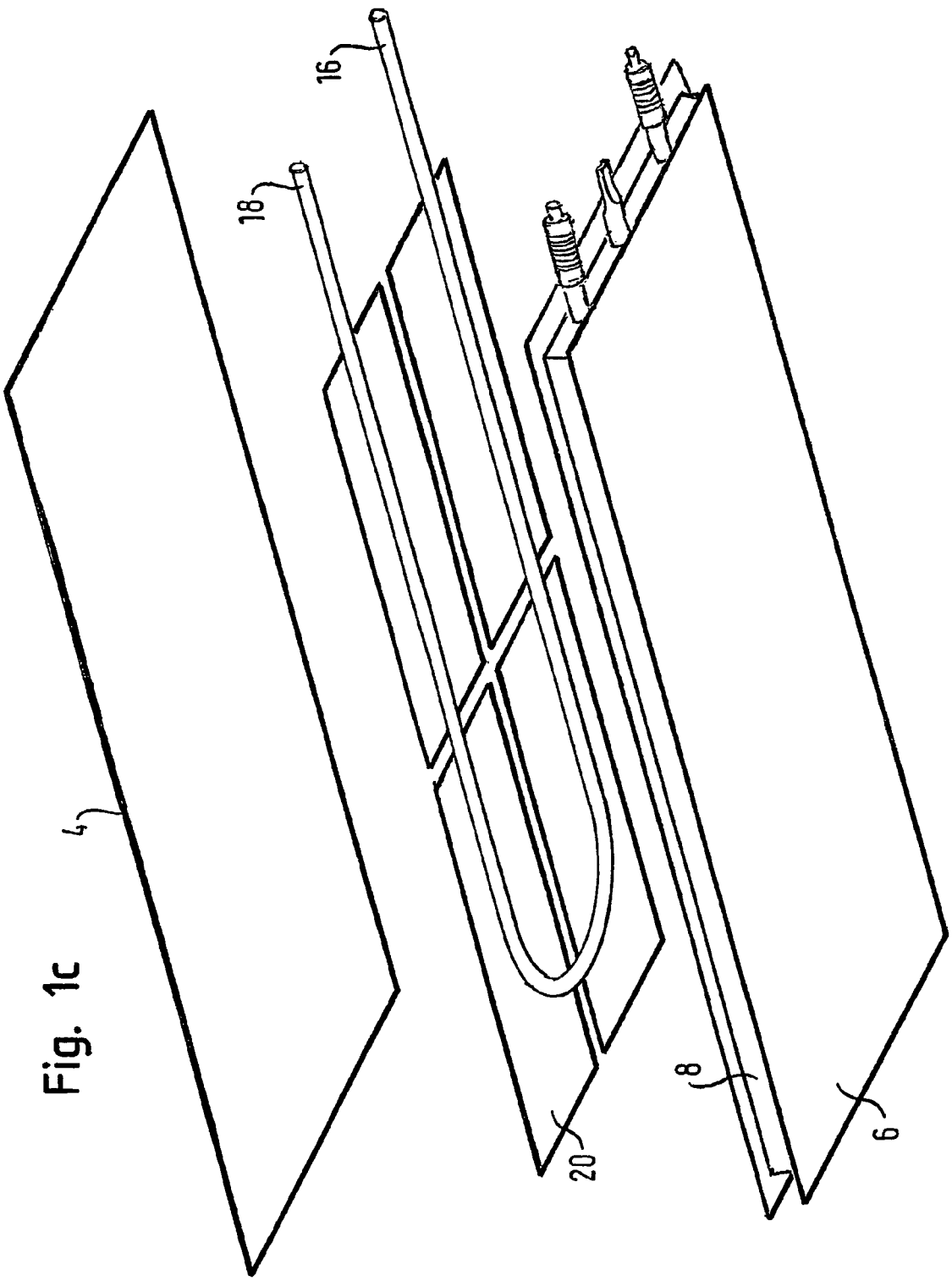

EVACUABLE FLAT PANEL SOLAR COLLECTOR

BACKGROUND

The preferred embodiment relates to an evacuable flat panel solar collector comprising at least one absorber, at least one conduit, a holding structure and at least one transparent wall. The preferred embodiment further relates to a flat panel solar collector system which comprises at least one flat panel solar collector according to the preferred embodiment and at least one mirror, and also to a flat panel solar collector array. Finally, the preferred embodiment relates to a method for the preparation of an evacuable flat panel solar collector according to the preferred embodiment.

Solar collectors, in particular flat panel solar collectors, are well-known devices which are usually used to absorb and transfer solar energy into a collection fluid. Principally, solar collectors are comprised of a blackened absorbing cylinder or plate contained in a housing which is frontally closed by a transparent window pane. Due to the diluted nature of solar light, in order to increase the operating temperature by reducing the thermal losses, solar collectors may be evacuated during use to eliminate gas convection and molecular conduction. Very high temperatures could also be achieved by light focusing. However, only direct light may be focusing, while diffuse light is lost. Therefore, this solution is not very attractive for regions, like central Europe, where about 50% of the solar light is diffuse. As the evacuation of flat panel solar collectors is problematic due to the need of a structure which is able to maintain high vacuum even under the huge forces resulting from atmospheric pressure, the focus has been on solar collectors which are based on a cylindrical glass envelope containing a cylindrical or flat absorber. Such a design can, for example, be found in U.S. Pat. No. 4,002,160 where a multiple tube solar energy collector having a diffusely reflecting surface positioned behind a collector tube array is disclosed which includes a plurality of double-wall tubular members wherein the outer wall is made of a glass material which is transparent about its entire circumference.

According to U.S. Pat. No. 4,579,107 a tubular collector is disclosed having very advantageous characteristics which is achieved by a method which is used to create both solar selective surfaces or coatings and reflective surfaces or coatings on glass by depositing, by spraying, molten metal onto their respective surfaces so that glass fuses upon contact with the molten metal, resulting in good adhesion and thermal contact.

Also the solar energy collection system according to U.S. Pat. No. 3,960,136 relies on the use of a double-wall glass tube the outer wall thereof being transparent about substantially its entire circumference. The space between the double walls is sealed at a sub-atmospheric pressure.

Although it has been well-known that versus an array of tubular collectors, as for example disclosed in U.S. Pat. No. 4,002,160, flat panel collectors allow for a maximum availability of energy for absorption, tubular solar collectors are still most often considered to be advantageous due to their easier manufacturing of the glass-to-metal seal, as required for maintaining high vacuum.

In U.S. Pat. No. 4,084,576 a bulb-type solar energy collector is disclosed which comprises a blackened solar absorber which is inserted into a flat lamp envelope thereby making use of a reliable sealing technique which is known for example from TV cathodic tubes.

From U.S. Pat. No. 3,916,871 a flat panel solar collector module can be derived which comprises a housing with an evacuated chamber defined therein, a transparent planar wall forming one side of said chamber and a radiant energy absorber with flow passages therein which is thermally insulated from the housing. In one embodiment a vacuum pump is connected through suitable conduits to the collector module to evacuate the same from time to time as necessary. According to U.S. Pat. No. 3,916,871 a vacuum in the area of one Torr (1 mm Hg) is considered to be sufficient to eliminate convection losses. However, in this document it is admitted that very low pressures that essentially eliminate also conduction losses would require a technology not commercially available.

In U.S. Pat. No. 5,653,222 a flat panel solar collector is disclosed with which it is attempted to provide an evacuated flat panel collector having structures sufficient to resist the forces applied by the atmosphere to an evacuated envelope. Heat losses from the absorber plate due to convection, conduction and thermal infra-red emissions, commonly called radiation, shall be overcome by a flat panel solar collector comprising a rear housing which is configured to provide a series of parallel cells, preferably semi-circular in cross-section, whereby each such cell is adapted to support the primary glazing and to receive a fin-tube absorber. These fin-tubes occupy at least 90% of the open area between the side walls of the cells such that the majority of radiation is absorbed and little radiation passes between the fin-tube absorbers and the side walls. It is stated that the circular cross-section of individual cells provides the best resistance to the deformation forces of the internal vacuum. A flat panel solar collector according to U.S. Pat. No. 5,653,222 affords a multitude of components the dimensions of which have to be accurately determined and which also have to be arranged in a complex predetermined fashion. Accordingly, flat panel solar collectors based on U.S. Pat. No. 5,653,222 are rather expensive and are also rather difficult to manufacture.

In U.S. Pat. No. 4,455,998 use is made of a solar collector which is comprised of at least one sealed evacuated transparent tube or envelope containing a heatable, reversible hydrogen getter comprised of one or more of the metals titanium, zirconium, hafnium, scandium, yttrium, lanthanum, the rare earths, strontium, barium, vanadium, niobium, tantalum, thorium and alloys thereof in a partly hydrogenized condition. The hydrogen pressure is increased by heating the reversible hydrogen getter which then releases hydrogen, while hydrogen is taken up again when the reversible hydrogen getter cools down. This mechanism ensures that the solar collector maintains its normal high efficiency as the losses of the solar collector can be increased by increasing the hydrogen pressure when the heat production of the solar collector exceeds the storage capacity of the remainder of the installation so that the temperature of the absorber tends to become too high. As an envelope for the solar collector only a glass tube is disclosed which has a round cross-section and encloses a plate-shaped absorber which is thermally conductively connected to the evaporator section of a heat pipe.

In spite of the merits of the solar collectors so far designed, the evacuated tubular collectors still present some major inconveniences. Each tube requires a glass-to-metal seal at each end with bellows to reduce heat conduction and to compensate for differential thermal expansion of the cooling pipe with respect to the room temperature envelope. Further, the tubes must be spaced apart to avoid shadowing, which results in a loss of absorbing capacity. Also, the maintenance and cleaning of multi-tube structures is rather problematic. Therefore, quite often an additional front glass is added to alleviate this problem, however resulting in an additional loss of transmitted light.

Although the above disadvantages of tubular solar collectors can at least partially be overcome by a flat evacuated solar panel, the major drawback of the flat systems still is that a large flat surface is less adequate to withstand atmospheric pressure. In addition, the peripheral glass-to-metal seal still gives cause for major problems. Probably because of these difficulties, the flat solar collector of U.S. Pat. No. 3,916,871 relies on a housing made from plastics having also a transparent plastic front. As a consequence this flat solar collector is evacuated only to 1 Torr, a pressure which may be sufficient to eliminate air convection, but not molecular conduction.

SUMMARY

Against this background, it is an object to provide a flat panel solar collector which can also be run at very high temperatures, which has an increased efficiency and which holds a very high vacuum over a very long period. It is also an object to provide a flat panel solar collector which also comprises large flat surfaces and which can withstand atmospheric pressure and ensures a high handling safety. Furthermore, it is an object to provide a reliable manufacturing process yielding highly vacuum-tight flat panel solar collectors.

In a flat panel solar collector adapted to be evacuable and vacuum-tight, at least one absorber is provided. At least one conduit is provided which is at least partially thermally associated with the at least one absorber. A holding structure is provided comprising a perimetric frame. At least one first transparent wall is provided, the first transparent wall and the holding structure having a overlapping area. At least one side of the first transparent wall comprises at least partially at said overlapping area a metal coating forming at least one metallized area on the transparent wall. A first soft metal ribbon is provided sealing the junction between the first transparent wall and the holding structure and which is soldered to the holding structure and to the metallized area of the first transparent wall.

BRIEF DESCRIPTION OF THE DRAWINGS

FIG. 1a depicts a schematic top view of a flat solar panel structure according to the preferred embodiment;

FIG. 1c depicts another exploded perspective view of the flat panel solar collector according to the preferred embodiment;

DESCRIPTION OF THE PREFERRED EMBODIMENT

Figure 1B:
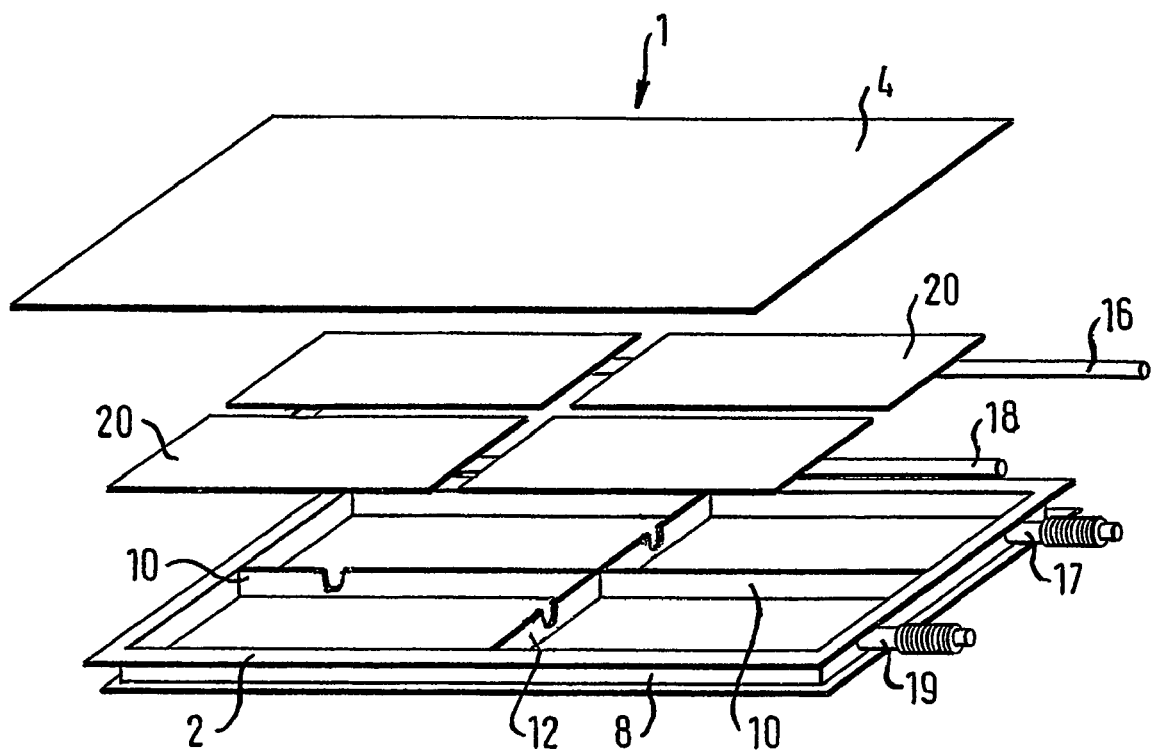
FIG. 1b depicts an exploded perspective view of a flat panel solar collector according to the preferred embodiment.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

With the preferred embodiment the following is provided: a flat panel solar collector which comprises at least one absorber, in particular a plate absorber; at least one conduit which is at least partially thermally associated with at least one absorber; a holding structure, in particular made from metal, comprising a perimetric frame, and at least one first transparent, in particular planar, wall, in particular a glass pane, wherein, in particular the perimeter of, the first transparent wall and the holding structure, in particular a first bearing surface of the frame, have an overlapping, in particular perimetric, area; at least one side of the first transparent wall comprises at least partially, in particular on at least part of the overlapping area and/or the perimeter of said side of the first transparent wall, a metal coating, in particular comprising a first metal layer, in particular a plasma spread copper layer, and a second metal layer, in particular a tin cover layer, thereby furnishing at least one metallized area on the transparent wall; the flat panel solar collector further comprising a, in particular first, soft metal ribbon, in particular a lead or/and copper ribbon, which is adapted to seal the junction between the first transparent wall and the holding structure and which is adapted to be soldered, in particular soft-soldered, to the holding structure, in particular to the perimetric frame, and to the metallized area of the first transparent wall.

In another aspect of the preferred embodiment the flat panel solar collector further comprises a bottom part attached to the holding structure, thereby forming a housing being adapted to be vacuum tight.

It is particularly preferred, when at least one soft metal ribbon is at least aligned partially parallel to the metal holding structure. Thus, the metal ribbon is most conveniently aligned to the underlying surface of the holding structure on which it rests.

According to one embodiment the perimeter of the transparent wall and the frame and/or the bottom part attached to the holding structure are fixed together by use of a soft metal ribbon, which is adapted to be soft soldered via at least one first soft soldered portion to the holding structure, in particular to the frame and/or bottom part of the holding structure, and/or via at least one second soft soldered portion to the transparent wall, in particular to the metallized area of the transparent wall.

The preferred embodiment also provides for a flat panel solar collector which further comprises at least one second transparent, in particular planer, wall, in particular glass pane, spaced apart from the first transparent wall by the holding structure, wherein, in particular the perimeter of, the second transparent wall and, in particular the second bearing surface of, the frame have an overlapping, in particular perimetric, area, wherein at least one side of the second transparent wall comprises at least partially, in particular on at least part of the overlapping area and/or the perimeter of said side of the second transparent wall, a metal coating, in particular comprising a first metal layer, in particular a plasma spread copper layer, and a second metal layer, in particular a tin cover layer, thereby furnishing at least one metallized area on the second transparent wall; and in particular a second, soft metal ribbon, in particular a lead and/or copper ribbon, which is adapted to seal the junction between the transparent second wall and the holding structure, in particular the frame, and which is adapted to be soldered, in particular soft-soldered, to the holding structure, in particular to the perimetric frame, and to the metallized area of the second transparent planar wall.

According to the preferred embodiment the flat panel solar collector also comprises at least one spacer, in particular in the form of a spacer array, in particular of metal bars.

Spacers are used to properly support the transparent planar wall of the flat panel solar collector, in particular when a glass pane covers too large a surface. Without spacers a larger transparent front pane would collapse under atmospheric pressure. Most preferably, an array of longitudinal and transversal metal bars, in particular with a height essentially identical to the depth of the collector housing, is used. Usually, it is sufficient to provide for longitudinal or transversal bars, in particular metal bars, having a width of around 1 to 10 mm. Thus, the dimensions of the elements of the holding structure, in particular the perimetric frame and the spacers, are designed such that all bearing areas of the holding structure which tightly support the transparent wall lie within a single plane. In such a way the forces applied on the transparent wall are most evenly distributed.

Preferably, at least one shielding plate, in particular a low emissivity shielding plate is used, which is adapted to be interposed between the absorber and the bottom part attached to the holding structure. With such shielding plates thermal losses can be further reduced, mainly because the radiation exchange of the absorber with the metallic part of the collector is reduced.

Regularly, the distance between the bottom of the housing and the transparent planar wall is about 1 to 10 cm. Advantageously, the distance between the bottom part when attached to the holding structure and the front transparent planar wall is in the range of about 2 to 6 cm. Furthermore, the thickness of the front glass pane is usually in the range of from about 1 to 10 mm. The thickness of the front glass pane mainly depends on the surface size of the glass pane and on the distance between the spacers.

According to a preferred embodiment at least the holding structure, in particular at least part of the inner wall of the holding structure, at least one spacer and/or the bottom part, in particular the inner wall of the bottom part, is/are made from copper, steel or aluminum and/or are coated with a low infrared absorbtivity film, in particular comprising copper and/or aluminum to reduce radiation losses of the absorber. Provisions are made that the material used for the holding structure, and/or the bottom part is adapted to be resistant to corrosion, in particular at the outside of the flat panel solar collector.

In another embodiment a flat panel solar collector is provided which further comprises at least one lumped getter and/or at least partially a getter coating, in particular having an average thickness of less than 1000 nm, on at least part of the absorber and/or the holding structure. It is preferred to have recourse to the getter technology in order to provide the flat panel solar collector of the preferred embodiment with an integrated pump. By using such an integrated pump it is possible to maintain pressures lower than 10-4 Torr which are usually necessary to reduce molecular conduction losses to a significant extent. In a preferred embodiment a thin film non-evaporable getter coating is applied, in particular on the back side of the absorber and/or on the internal surface of the housing or holding structure. Care should be taken that the getter coating thickness does not impair the emissivity of the underlying copper or aluminum alloy coating. Usually, the thickness of the getter coating should be kept at a few hundred nm, in particular in the range of from about 100 to 600 nm, and most preferred at about 100 nm. The getter coating technique is for example disclosed in U.S. Pat. No. 6,468,043. As a lumped getter pump, getters commercially available, as for instance the St 707 non-evaporable getter produced by SAES Getters, could be used.

Also, a flat panel solar collector is provided which further comprises between the transparent wall and the absorber at least one additional transparent wall and/or an infrared mirror coating on the internal side of the transparent wall and/or on the internal side or both sides of the additional transparent wall. In order to reduce the radiation losses to the front glass wall even further additional glass panes and/or infrared mirror layer coatings can be employed.

In one aspect of the preferred embodiment vacuum-tight connecting port(s) are integrated into the perimetric frame and in particular comprising at least one expansion bellow. Also, provisions can be made that at least one connecting port in the form of a pumping port being incorporated into the perimetric frame or lateral wall of the holding structure for the initial evacuation of the collector. Cooling pipes or conduits which are disposed within the flat panel solar collector extend through the wall of the housing of the flat panel solar collector in vacuum-tight fashion. Due to different thermal behavior of the conduits and the housing, expansion bellows can be employed in the vicinity of the connection of the housing and the conduit or cooling pipe. The pumping port is preferably designed as such that after completion of the evacuation process the connecting pipe is valved off. That connecting pipe may also be pinched off, in particular if made of copper.

In a another preferred embodiment provisions may be made that the holding structure, in particular the frame, comprises a lateral wall and a, in particular perpendicular thereto, supporting surface connected to the lateral wall which is adapted to carry, in particular the perimeter of, the transparent wall. It is particularly preferred if the frame of the flat panel solar collector comprises a perimetric lateral wall which encircles the bottom of the housing and which is in particular aligned perpendicular to the bottom of the housing. In a preferred embodiment the supporting surface which is connected to the lateral wall is aligned parallel to the bottom of the housing at least where it is opposite to the supporting surface. Such a U-shaped profile of the edge portion of the flat panel solar collector allows for a very robust fixture of the front transparent planar wall.

In another embodiment it is preferred that at least one soft metal ribbon is at least partially disposed between the transparent planar wall and the supporting surface of the frame and wherein at least a first portion of said metal ribbon is soldered, in particular soft soldered, to the, in particular metallized area of the transparent planar wall and/or to the housing, in particular to the lateral wall and/or to the supporting surface, and/or wherein at least a second portion of the metal ribbon is soldered, in particular soft soldered, to the, in particular metallized area of the transparent planar wall and/or to the housing, in particular to the lateral wall and/or to the supporting surface. It has been found that a very effective sealing of the flat panel solar collector of the preferred embodiment can be achieved by using a tin-copper metallization of the transparent planar wall, in particular by metallization of the perimeter of one of the two surfaces of the transparent planar wall. A soft metal ribbon can then be soft soldered to both the housing, which is usually made of metal, and to the glass wall. It is preferred to dispose the soft metal ribbon between the interior side of the glass wall and the supporting surface which is connected to the lateral wall of the housing, thereby minimizing the dead volume under vacuum and protecting the glass wall from scratches which may be produced by friction against the metallic structure of the supporting surface of the frame.

Thus, provisions are being made that at least one first portion of a soft metal ribbon is soldered, in particular soft soldered, to the housing, in particular to the frame and/or to the supporting surface of the frame, and wherein a second portion of the soft metal ribbon is soldered, in particular soft soldered, to the transparent wall, in particular to a metallized area of the planar wall.

In another aspect of the preferred embodiment provisions are being made that the absorber comprises at least one copper plate, in particular an OFE and/or OFS copper plate, which is coated with a selective absorber film, in particular chromium black, at least on that side which is exposed to solar radiation. Absorbers made from copper plates usually exhibit an average thickness of around 1 to 2 mm, e.g. when OFE or OFS copper plates are used. In general, as a selective absorber film such films are preferred which are capable to withstand long-term heating at around 350 to 400° C. The back of the absorber plates are preferably fixed to a conduit, e.g. a cooling pipe for heat extraction. For applications up to 150° C. usually water can be used as a cooling fluid, while for higher temperature applications oil or air is preferred.

Also, flat panel solar collectors are provided in which at least one, in particular essentially U-shaped, conduit is thermally attached to at least one absorber, in particular by welding or brazing, and/or wherein the conduit(s) is/are arranged to not be in direct thermal contact with the holding structure, in particular the perimetric frame and/or at least one spacer.

Further, in one embodiment at least one external pump, in particular a turbo molecular pumping station is provided. Such an external pump can be used to initially establish a sufficiently low pressure so that in the following use can be made of an integrated pumping, e.g. based on the getter technology.

Objects can also be solved by a solar collector wherein also the back part of the collector comprises a transparent wall. Thus, a flat panel solar collector is provided which comprises at least one absorber, in particular a plate absorber, at least one conduit which is at least partially thermally associated with a least one absorber, a perimetric frame, in particular a metal frame, a front transparent wall and a back transparent wall wherein, in particular the perimeter of, the front transparent wall and the upper side of the frame and, in particular the perimeter of, the back transparent wall and the lower side of said frame each have an overlapping perimetric area, wherein at least part of the overlapping area of that side of the front transparent planar wall which is facing the upper side, in particular a supporting surface, of the frame and wherein at least part of the overlapping area of that side of the back transparent wall which is facing the back side, in particular a supporting surface, of the frame are each coated with at least one first metal layer, in particular are metallized with a plasma spread copper layer, and wherein each first metal layer is protected with at least one second metal layer, in particular a tin cover layer, and wherein, in particular the perimeter of, the front transparent wall and said frame and in particular the perimeter of, the back transparent wall and said frame are each fixed together by use of a first and second, in particular perimetric, soft metal ribbon, in particular a lead and/or copper metal ribbon, the first metal ribbon being adapted to be soft soldered, in particular via at least one first portion, to the metallized area of the front transparent planar wall and via at least one second portion, in particular on its opposite side, to said frame, in particular across defined soldering portions, and wherein, in particular the perimeter of, the back transparent wall and said frame, are fixed together by use of a second, in particular perimetric, soft metal ribbon, in particular a lead and/or copper metal ribbon, which is adapted to be soft soldered, in particular via at least one first portion, to the metallized area of the back transparent planar wall and via at least one second portion, in particular on its opposite side, to the frame, in particular across defined soldering portions. The first and second soft metal ribbons are preferably at least partially aligned parallel to the holding structure.

Special benefits can be harnessed by a flat panel solar collector system in which combined use is made of a flat panel solar collector of the preferred embodiment and a mirror which is suited to reflect solar light onto the back transparent planar wall thereby allowing to increase the incident solar flux on the absorber most effectively. Thus, a flat panel solar collector system is provided which comprises at least one flat panel solar collector and at least one mirror, in particular an essentially half cylindrical mirror, the mirror being adapted to reflect light onto at least one transparent wall of said flat panel solar collector. In one preferred embodiment, the flat panel solar collector can be placed above the half cylindrical mirror, in particular in such a way that even the diffuse component of the solar light which enters the mirror can almost completely be reflected on the back of the flat panel solar collector.

In another embodiment, e.g. if a half cylindrical mirror is used, the solar collector being essentially aligned along the axis of said half-cylindrical mirror.

Further, it is herewith proposed that the cross-section of the mirror exhibits the shape of a circular arc or of a part thereof, in particular being smaller than a semi-circle.

According to another embodiment a flat panel solar collector system is provided in which the solar collector is located above two adjacent half cylindrical mirrors or mirrors the cross-section of which exhibits the shape of a circular arc. By locating the mirrors adjacent to each other, both will reflect the solar light which enters the mirrors on the back portions of said collector.

When using a flat panel solar collector the front and back walls of which are transparent it is preferred to blacken the front and back sides of the absorber with a selective absorber film, in particular with chromium black or any other coating capable of withstanding long-term heating at about 350 to 400° C.

The surface outgassing can be greatly reduced if the entire flat panel solar collector is heated preferably at about or above 150° C., in particular for a few hours, while evacuating said collector with an external pumping station. Accordingly, the flat panel solar collectors are preferably being made according to the following steps:

a) providing at least one holding structure, in particular at least one perimetric frame and/or at least one spacer, at least one absorber, in particular a plate absorber, at least one conduit, at least one first transparent wall, at least one bottom part and/or at least one second transparent wall, wherein, in particular the perimeter of, the first and/or second transparent wall comprises at least partially a metal coating, in particular comprising a first metal layer, in particular a plasma spread copper layer, and a second metal layer, in particular a tin cover layer,
b) fitting the spacer(s) into the perimetric frame,
c) fitting at least one conduit being thermally associated to an absorber, in particular by welding or brazing, onto at least one spacer, in particular by at least one snap fitting element, and into connection ports in the perimetric frame,
d) welding the ends of the conduit to the connecting ports,
e) fitting the first transparent wall onto the metal coating of which a soft metal ribbon has been soft-soldered onto the holding structure,
f) soldering said soft metal ribbon to the holding structure, thereby in particular aligning at least part of the soft metal ribbon essentially in parallel to the holding structure,
g) evacuating the solar panel, in particular via a pumping port, by use of at least one external pump,
h) heating the flat panel solar collector from about 120° C. to about 170° C., in particular to about 150° C., for a period of time, in particular for at least 30 min, sufficient to provide a sufficient outgassing of the collector,
i) heating the flat panel solar collector, in particular those parts of said flat panel solar collector which comprise a lumped getter and/or a getter coating, to temperatures above 170° C., in particular to about 180° C. or higher, in order to activate the getter, and
j) isolating the flat panel solar collector, in particular by closing a valve or by pinching off the conduit connection at the pumping port.

As part of this method or separately the getter pump or getter coating can be thermally activated prior to closing the pumping port by keeping the panel at an elevated temperature over a sufficient period of time. For example, if a TiZrV coating is used as a getter material heating is preferably continued at about 180 to 200° C. for around 2 hours. By this method a pressure lower than $10^{-8}$ Torr can be obtained. The flat panel solar collector is then isolated, e.g. by a valve or preferably by pinching-off the connecting pipe.

If the holding structure and the bottom part are not already joined together the step of fitting the bottom part to the holding structure, in particular to its frame, in a vacuum-tight manner can be incorporated into the manufacturing process.

In case both sides of the holding structure should be provided with a transparent wall instead of fitting a bottom part to the holding structure the following step has to be incorporated into the manufacturing process: fitting the second transparent wall onto the metal coating of which a soft metal ribbon has been soft-soldered onto the holding structure, and soldering the soft metal ribbon to the holding structure.

The preferred embodiment is thus based on the surprising perception that a flat panel solar collector can be obtained with which very low pressures are accessible thereby providing a highly sufficient peripheral glass-to-metal seal. The flat panel solar collector of the invention is thus well suited to accommodate thermal constraints which result from differential expansion of different materials of the solar collector without damaging the seal. These flat panel solar collectors can therefore be used over very long periods without the need to evacuate the housing by use of an external pumping station. Also, the flat panel solar collectors of the preferred embodiment can be used under various climatic conditions and for a multitude of different applications. Also, the entire temperature range of from about 30° C. up to about 300° C. and even higher can be covered. With the flat panel solar collectors, even those being exposed to solar radiation from one side only, equilibrium temperatures of about 350° C. and more have been obtained. Apart from domestic heating which can already be achieved by non-evacuated collectors the solar collectors can also be used for the generation of electric power, for example by means of collector fields, for refrigeration and air conditioning. Moreover, the flat panel solar collectors can be used for the generation of hydrogen from water, the desalination of see water and the generation of hot oil for commercial or residential cooking.

Also, the maintenance of said solar collectors is rather easy and the time required for maintenance work is reduced. It is another advantage that a solar collector is disclosed which can be very easily assembled and which, therefore, allows for an economic mass production. It is also of great advantage that a very reliable metal to glass seal is provided. As also very large transparent panels can be used a large variety of technical applications is accessible with the flat panel solar collector.

In FIG. 1a a flat panel solar collector 1 is shown having a rectangular shape and comprising a housing 2 in the form of a metal box and a top transparent planar wall 4. The housing 2 comprises an essentially flat bottom part 6 and a perimetric lateral frame 8. The top transparent planar wall 4 is placed along its perimeter on frame 8. Longitudinal and transversal metal bars 10 and 12 are used as spacers to support the transparent planar wall 4. Low pressure within the flat panel solar collector 1 can be built up via connecting port 14 which exhibits a lateral connection via frame 8 into the housing 2. Conduits or cooling pipes 16 and 18 are placed within the housing, preferably between the bottom part 6 and absorber plates 20 (shown in dotted lines in order to reveal the underlying cooling pipe system). The surface of the absorber 20 which is subjectable to solar light is preferably coated with a black film. Furthermore, the cooling pipes 16 and 18 are thermally connected to the back of the absorber plate 20. The flat panel solar connector 1 according to FIG. 1 a further comprises a lump getter pump (not shown), e.g. adjacent to frame 8, with which very low pressures can be obtained and also maintained over very long periods. It has been found to be advantageous to provide cooling pipes 16 and 18 which have expansion bellows 24 and 26 outside the housing 2 in order to cope with differential thermal expansion.

In FIG. 1b a flat panel solar collector 1 is shown with its individual components artificially spaced apart from their built-in positions. The holding structure 2 is of rectangular shape having a perimetric frame 8 and a longitudinal and transversal spacer metal bar 10 and 12, respectively, forming a cross-like shape. The height of these spacer bars and the perimetric frame is adjusted as such that a cooling pipe 16, 18 and absorber plates 20 can be accommodated within the housing of the flat panel solar collector 1, when the transparent planer wall is placed on top of them. The individual absorber plates 20 are sized as such that they fit in the compartments generated by the spacer bars and the perimetric frame 8. The cooling pipe 16, 18 is attached to the individual absorber plates, for example having a U-shape, thereby having contact with all four absorber plates 20. Most conveniently, the spacer bars 10 and 12 are provided with respective cut-outs, e.g. in the form of clips, in order to take up and fixate the cooling pipe 16, 18. Care should be taken that there is essentially no thermal contact between the cooling pipe 16, 18 and the spacer bars 10 and 12. This can for example be achieved by using clips or other distant pieces. The terminal portions 16, 18 of the cooling pipe within the holding structure 2 merge into connecting ports 17 and 19, respectively, which are integrated into the perimetric frame 8.

From FIG. 1c an exploded view of the flat panel solar collector according to FIG. 1b seen from below can be derived. As shown in FIG. 1c the cooling pipe 16, 18 is attached to the entire bottom part of each individual absorber plate 20 in order to secure a maximum transfer of thermal energy from the absorber plate 20 to the fluid transferred in the cooling pipe. In an alternative embodiment not only the cover plate of the flat panel solar collector can be provided with a transparent planar wall 4, but also its back part, thereby substituting the bottom part 6 of the housing by another transparent planar wall. In this embodiment, the absorber plates 20 are blackened on both sides. Alternatively, another set of absorbing plates 20 is placed between the second transparent planar wall and the cooling pipe 16, 18. In such an embodiment the cooling pipe 16, 18 is sandwiched between two sets of absorber plates and is thus thermally associated on opposite sides of its tubing with said opposing absorber plates. However, it is also possible, to provide the second set of absorber plates with a separate cooling pipe system, so that between the first and second set of absorber plates at least two separate cooling pipes are arranged.

Figure 1D:
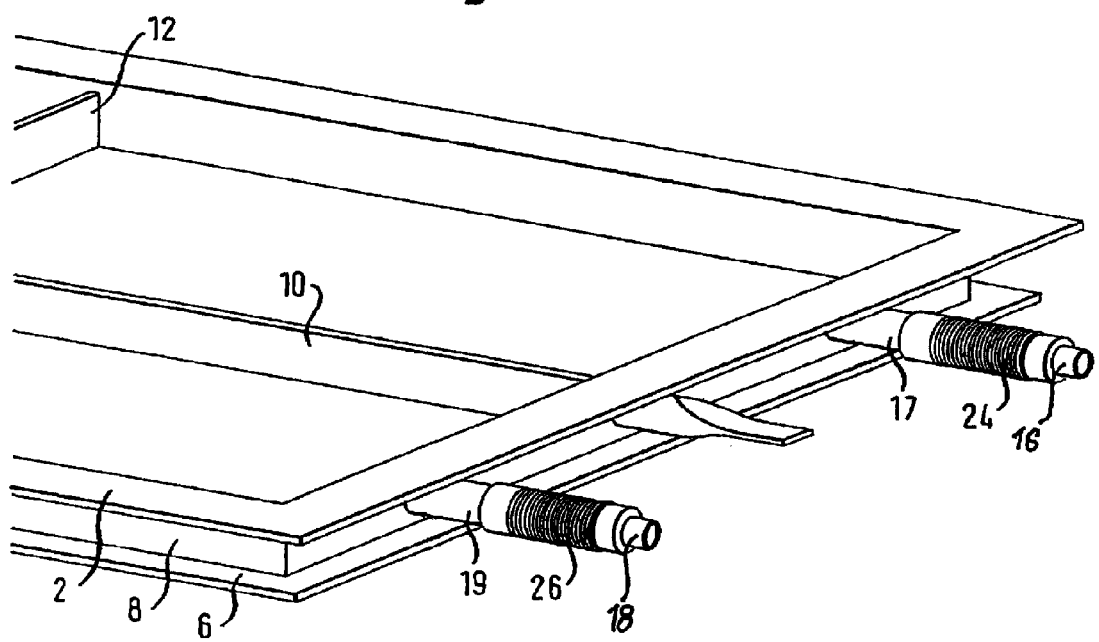
FIG. 1d depicts a schematic sectional view of the lateral part of the flat panel solar collector according to FIG. 1c.

In FIG. 1d a section of the flat panel solar collector 1 according to FIG. 1b can be seen in an enlarged manner. The connecting ports 17 and 19 which take up the terminal portions of the cooling pipe 16, 18 are each provided with expansion bellows 24 and 26 in order to cope with a thermally induced change of dimension. The pumping port is shown after having been closed and pinched off in order to secure a highly vacuum-tight housing of the flat panel solar collector 1.

Figure 1E:
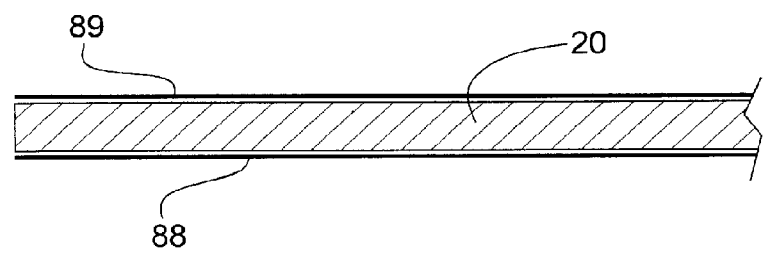
FIG. 1e depicts a getter layer and an absorber film on absorber plate of FIG. 1b.

FIG. 1e shows a getter coating layer 88 on a back-side of absorber plate 20 and a selective absorber film 89 on a first side of plate 20 subject to solar radiation.

Figure 2:
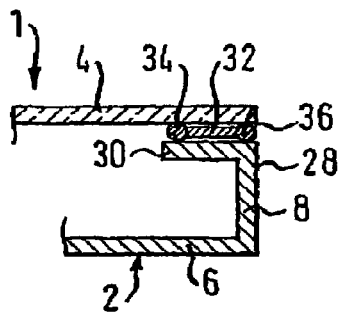
FIG. 2 depicts a schematic cross-sectional view of a peripheral seal configuration of a flat panel solar collector according to the preferred embodiment.
Figure 2A:
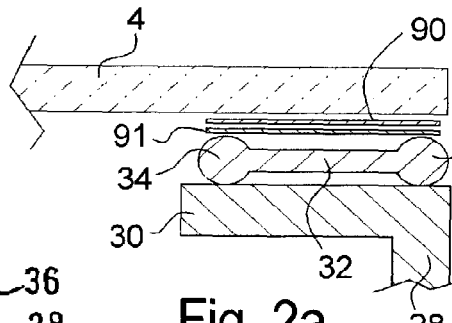
FIG. 2a depicts a two layer structure in FIG. 2 at a peripheral seal configuration of FIG. 2.
Figure 4:
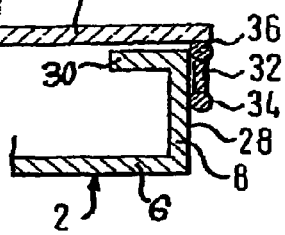
FIG. 4 depicts a schematic cross-sectional view of a peripheral seal configuration of a flat panel solar collector according to the preferred embodiment.

In FIGS. 2 to 5 different sealing modes are depicted which can be used to connect the top transparent planar wall 4 to a housing 2. In FIG. 2 a cross-sectional view is shown of the edge portion of a flat panel solar collector 1 in a schematic manner. The frame 8 comprises a lateral wall segment 28 which is essentially perpendicular to the bottom part 6, and at the outer edge of the lateral wall 28 a supporting surface 30 is provided which preferably extends parallel to the bottom part 6, thus being essentially perpendicularly orientated to the lateral wall 28. The sealing of the flat panel solar collector 1 is achieved according to the embodiment of FIG. 2 by disposing a soft metal ribbon 32 between the perimeter of the planar wall 4 and the supporting surface 30. In this embodiment, as shown in FIG. 2a at least the bottom surface of the planar wall 4 is coated via a first metal plasma spread copper layer 90 and a second metal tin cover layer 91 forming a metallization along its perimeter, preferably where those portions of the soft metal ribbon are placed which shall be soft soldered to the planar wall 4. In the present example, the soft metal ribbon 32 has a first portion 34 which is soft soldered to the upper supporting surface 30, which is usually made from metal, as is the entire housing 2. Furthermore, the soft metal ribbon 32 is fixed to the transparent wall 4 via a second soft soldered portion 36, thereby furnishing a very tight sealing which also is well suited to minimize the dead volume under vacuum. As there is no direct contact between the transparent wall 4 and the frame 8 the transparent wall is protected from scratches which may be produced by friction against the metallic structure of said frame. As a common feature of a preferred joining mode between the glass plate and the metal holding structure the soft metal ribbon is at least partially arranged essentially parallel to the metal holding structure, e.g. the frame.

Figure 5:
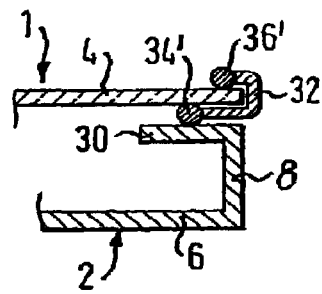
FIG. 5 depicts a schematic cross-sectional view of a peripheral seal configuration of a flat panel solar collector according to the preferred embodiment.

Similarly, FIG. 5 provides for an alternative sealing mode for a flat panel solar collector of the invention which also prevents a direct contact between the planar wall 4 and the supporting surface 30. Different from FIG. 1, the soft metal ribbon 32 is soft soldered with a first portion 34 to the supporting surface 30, preferably located at one end of the soft metal ribbon 32, and to the top transparent planar wall 4 via a second soft soldered portion 36, which is fixed to the metallized front perimeter of the planar wall 4.

Figure 3:
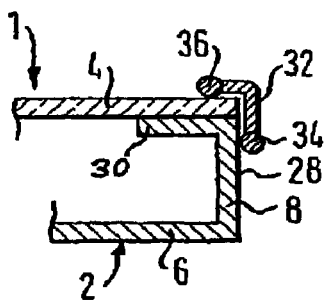
FIG. 3 depicts a schematic cross-sectional view of a peripheral seal configuration of a flat panel solar collector according to the preferred embodiment.

Alternatively, a tight sealing can also be obtained by use of a soft metal ribbon 32 which is attached to the lateral wall 28 via a first soft soldered portion 34 and to the top surface at the perimeter of the transparent planar wall 4 via a second soft soldered portion 36. The soft metal ribbon 32 is thus sealing the junction of the planar wall 4 and the supporting surface 30, FIG. 3. Another sealing mode can be derived from FIG. 4 according to which the soft metal ribbon 32 is attached to the lateral wall 28 via a first soft soldered portion 34 and to the lower surface of the transparent planar wall 4 via a second soft soldered portion 36. In this case, the lower surface of the transparent planar wall 4 is covered with a metal layer as described above along its perimeter. Different from those embodiments as shown in FIGS. 2, 3 and 5 the flat panel solar collector 1 of FIG. 4 uses a transparent planar wall 4 which is slightly bigger in size than the housing 2, thus extending over the lateral wall 28 along its perimeter.

Figure 6:
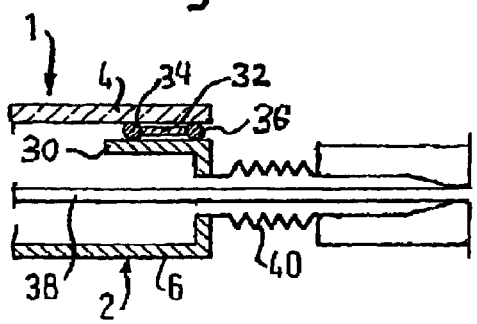
FIG. 6 shows a cross-sectional view of a peripheral seal configuration of a flat panel solar collector of the preferred embodiment also comprising a cooling pipe.
Figure 7:
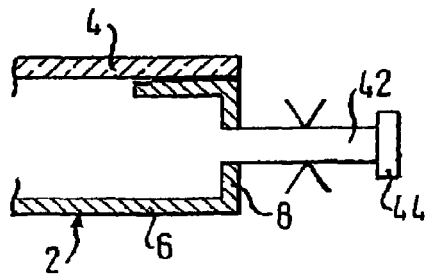
FIG. 7 shows a schematic cross-sectional view of a peripheral seal configuration of a flat panel solar collector of the preferred embodiment also comprising a lateral connection for evacuation.

In FIG. 6 the connection of the cooling pipe 38 is depicted in a schematic drawing. Expansion bellows 40, which are connected to an opening in the lateral frame 8 on the one hand and to, for example, a thermal insulation on the other hand, are used to cope with the differential thermal expansion of different materials used within the flat panel solar collector 1. Also, as can be seen in FIG. 7, a lateral connection 42 can be provided as a connection structure for an external pumping station. The connecting port 44 can for example be provided with a valve in order to seal the flat panel solar collector 1. Preferably, the lateral connection is pinched-off to provide a proper sealing.

Figure 8:
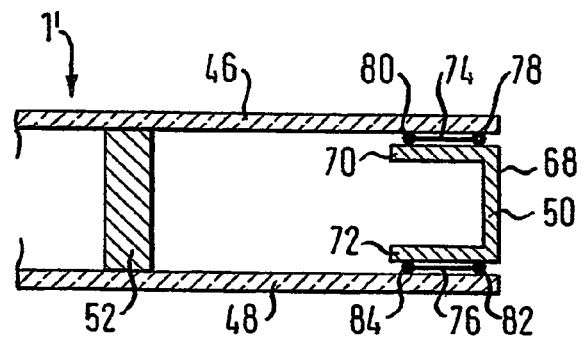
FIG. 8 shows another embodiment of a flat panel solar collector of the preferred embodiment.

From FIG. 8 an alternative flat panel solar collector 1' can be derived which comprises a top transparent planar wall 46, a bottom transparent planar wall 48 and a peripheral wall or frame 50 which is preferably made from metal. Most preferably, frame 50 is provided with a lateral wall 68 and with perimetric supporting surfaces 70 and 72 on its top and bottom parts on which the top and bottom transparent planar walls 46 and 48 can be placed, respectively. As with flat panel solar collector 1 also the solar collector 1' can be provided with metal bars 52 which function as spacers and which support both, the top and bottom transparent planar walls 48 and 46. Again, a tight junction between the top planar wall 46 and the surface 70, and between the bottom planar wall 48 and the supporting surface 72 can be achieved by individual soft metal ribbons 74 and 76, respectively, each comprising soft soldered portions 78, 80 and 82, 84. At least those portions of the planar walls 46, 48 to which the soft metal ribbons are soft soldered have been metallized, in particular by a double metal layer system, e.g. a tin/copper double layer. It is also possible to use a single soft metal ribbon which extends from the top supporting surface along the lateral wall to the bottom supporting surface (not shown).

Figure 9:
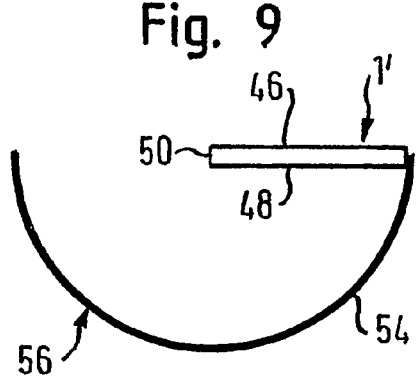
FIG. 9 shows another embodiment of a flat panel solar collector of the preferred embodiment.
Figure 10:
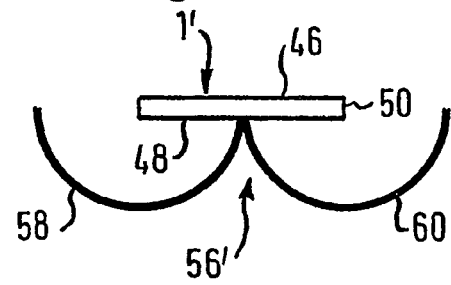
FIG. 10 shows another embodiment of a flat panel solar collector system of the preferred embodiment.

In a preferred embodiment the flat panel solar collector I' is used in combination with a half cylindrical or trough-like mirror 54 thereby furnishing a flat panel solar collector system 56. In one embodiment which is shown in FIG. 9 flat panel solar collector 1' is located along the axis of a half cylindrical mirror 54 covering essentially one half of said mirror opening. Solar light can then enter that portion of the half cylinder which is not covered by the solar collector 1', and can thus be reflected on the back of the collector. In this way the incident solar flux on the absorber can be most effectively increased. Preferably, the absorber is coated with a black surface on its top as well as on its back part. The concept underlying the flat panel solar collector system 56 can also be exploited with an arrangement as depicted in FIG. 10. The flat panel solar collector system 56' of FIG. 10 makes use of two adjacent half cylindrical mirrors which are joined or attached or at least in close vicinity at there respective edge portions thereby being essentially W-shaped. On top of this junction of both half cylindrical mirrors 58, 60 the flat panel solar collector 1' is placed, thereby covering a portion of the half cylindrical mirror 58 as well as a portion of the half cylindrical mirror 60. Solar light can then enter both half cylindrical mirrors 58 and 60 via those portions which are not covered by flat panel solar collector 1'.

While the invention has been illustrated and described in detail in the drawings in the above description, the same is to be considered as illustrative and not restrictive in character, it being understood that only the preferred embodiment has been shown and described and that all changes and modifications that come within the scope of the invention are desired to be protected.

I claim:

1. A flat panel solar collector adapted to be evacuable and vacuum-tight, comprising:
   at least one absorber;
   at least one conduit which is at least partially thermally associated with said at least one absorber;
   a holding structure comprising a perimetric frame;
   at least one first transparent wall;
   the first transparent wall and the holding structure having a substantially flat overlapping area, the holding structure overlapping area comprising a metal;
   at least one side of the first transparent wall comprising at least partially at said overlapping area a metal coating comprising a copper layer and tin cover layer forming at least one metalized area on the transparent wall at an edge of the wall; and
   a first soft metal ribbon sealing a junction between the first transparent wall and the holding structure, said metal ribbon comprising at least one of the elements selected from the group consisting of copper and lead, and which is soldered to the holding structure overlapping area comprising said metal with a first soft soldered portion at an inside edge of the ribbon and to the metalized area of the first transparent wall at an opposite outside edge of the ribbon with a second soft soldered portion at said edge of the transparent wall.

2. A flat panel solar collector according to claim 1 further comprising a bottom part attached to the holding structure to form a housing which is vacuum-tight.

3. A flat panel solar collector according to claim 1 further comprising at least one second transparent wall spaced apart from the first transparent wall by the holding structure and wherein the second transparent wall and the frame have an overlapping area, wherein at least one side of the second transparent wall comprises at least partially at the overlapping area a metal coating providing at least one metalized area on the second transparent wall; and a second, soft metal ribbon sealing a junction between the second transparent wall and the holding structure, and which is soldered to the holding structure and to the metallized area of the second transparent wall.

4. A flat panel solar collector according to claim 1 wherein said first soft metal ribbon is at least partially aligned substantially parallel to the holding structure.

5. A flat panel solar collector according to claim 1 wherein the holding structure further comprises at least one spacer.

6. A flat panel solar collector according to claim 1 further comprising at least one shielding plate interposed between the absorber and a bottom part attached to the holding structure.

7. A flat panel solar collector according to claim 1 wherein a distance between a bottom part attached to the holding structure and the first transparent wall is about 1 to 10 cm.

8. A flat panel solar collector according to claim 1 wherein the holding structure comprises copper, steel, or aluminum and is coated with a low infrared absorbtivity film.

9. A flat panel solar collector according to claim 1 wherein a material used for the holding structure is resistant to corrosion.

10. A flat panel solar collector according to claim 1 further comprising at least one getter on at least part of the absorber or the holding structure.

11. A flat panel solar collector according to claim 1 further comprising an infrared mirror coating on an internal side of the first transparent wall.

12. A flat panel solar collector according to claim 1 wherein the conduit comprises a vacuum-tight connecting port integrated into the perimetric frame.

13. A flat panel solar collector according to claim 1 further comprising at least one connecting port in the form of a pumping port incorporated into the perimetric frame of the holding structure.

14. A flat panel solar collector according to claim 1 wherein the holding structure frame comprises a lateral wall and a supporting surface connected to said lateral wall adapted to carry the first transparent wall.

15. A flat panel solar collector according to claim 14 wherein at least one first portion of said soft metal ribbon is soldered to the supporting surface of the frame, and wherein a second portion of the soft metal ribbon is soldered to the first transparent wall.

16. A flat panel solar collector according to claim 1 wherein the absorber comprises at least one copper plate coated with a selective absorber film at least on a side which is subjectable to solar radiation.

17. A flat panel solar collector according to claim 1 wherein the conduit is thermally attached to the at least one absorber and the conduit is arranged to not be in direct thermal contact with the holding structure.

18. A flat panel solar collector system, comprising:
   at least one flat panel solar collector adapted to be evacuable and vacuum-tight, said solar collector comprising at least one absorber;
      at least one conduit which is at least partially thermally associated with said at least one absorber;
      a holding structure comprising a perimetric frame;
      at least one first transparent wall;
      the first transparent wall and the holding structure having a substantially flat overlapping area, the holding structure overlapping area comprising a metal;
      at least one side of the first transparent wall comprising at least partially at said overlapping area a metal coating comprising a copper layer and tin cover layer forming at least one metallized area on the transparent wall; and
      a first soft metal ribbon sealing a junction between a first transparent wall and the holding structure, said metal ribbon comprising at least one of the elements selected from the group consisting of copper and lead, and which is soldered to the holding structure overlapping area comprising said metal with a first soft soldered portion at one inside edge of the ribbon and to the metallized area of the first transparent wall at an opposite outside edge of the ribbon with a second soft soldered portion at said edge of the transparent wall; and at least one mirror positioned to reflect light onto said at least one first transparent wall of said flat panel solar collector.

19. A flat panel solar collector system according to claim 18 wherein said solar collector is substantially aligned along an axis of a half-cylindrical mirror.

20. A flat panel solar collector system according to claim 18 wherein a cross-section of the mirror exhibits a shape of at least a portion of a circular arc.

21. A flat panel solar collector system according to claim 18 wherein the solar collector is located above two adjacent mirrors a cross-section of which exhibits a shape of at least a portion of a circular arc.

22. A flat panel solar collector system according to claim 18 wherein at least two of said flat panel solar collectors are provided and said mirror reflecting light onto said at least two flat panel solar collectors at the respective first transparent wall of each.

23. A method for preparation of a flat panel solar collector, comprising the steps of:
providing at least one holding structure comprising a perimetric frame with connection ports, said holding structure having a substantially flat overlapping area comprising a metal, at least one absorber, at least one conduit, at least one first transparent wall, at least one bottom part or at least one second transparent wall, and a metal coating comprising a copper layer and tin cover layer on a side of and at a periphery edge of the first transparent wall;
providing a soft metal ribbon soldered to said metal coating with a second soft soldered portion at an outside edge of the ribbon at said periphery edge, said metal ribbon comprising at least one of the elements selected from the group consisting of lead and copper;
providing a getter;
fitting a spacer into the perimetric frame;
fitting at least one conduit in thermally associated fashion to the at least one absorber, and into the connection ports of the perimetric frame;
connecting ends of the conduit to the connecting ports;
fitting the first transparent wall onto the holding structure;
soldering said soft metal ribbon to the holding structure overlapping area comprising said metal with a first soft soldered portion at an opposite inside edge of said soft metal ribbon;
evacuating the solar panel by use of at least one external pump; and
heating the flat panel solar collector for a period of time to provide a sufficient outgassing of the collector and heating the flat panel solar collector in order to activate the getter.

24. A method according to claim 23 further comprising the step of fitting the bottom part to the holding structure in a vacuum-tight manner before evacuating the solar panel.

25. A method according to claim 23 further comprising the step of providing the second transparent wall with a metal coating at one side and at a periphery thereof, and providing a soft metal ribbon soldered to said metal coating, and fitting the second transparent wall onto the holding structure, and soldering said soft metal ribbon to the holding structure.

26. A method according to claim 23 wherein the flat panel solar collector is heated from about 120° C. to about 170° C. to provide said sufficient outgassing of the collector.

27. A method according to claim 23 including the step of heating said flat panel solar collector to a temperature of about 170° C. in order to activate the getter.

28. A flat panel solar collector adapted to be evacuable and vacuum-tight, comprising:
at least one absorber;
at least one conduit which is at least partially thermally associated with said at least one absorber;
a holding structure;
at least one transparent wall;
the transparent wall and the holding structure having a substantially flat overlapping area, said holding structure overlapping area comprising a metal;
a side of the first transparent wall comprising at least partially at said overlapping area a metallized area comprising a plasma spread copper layer and tin cover layer on the transparent wall at an edge of the wall;
a metal ribbon sealing a junction between the first transparent wall and the holding structure by soft soldering with a second soft soldered portion at an outside edge of the ribbon to said transparent wall metalized area and to said holding structure overlapping area comprising said metal with a first soft soldered portion at an opposite inside edge of said ribbon, said ribbon comprising at least one of the elements selected from the group consisting of lead and copper; and
a wall on said holding structure opposite the transparent wall.

29. A method for preparation of a flat panel solar collector, comprising the steps of:
providing at least one holding structure having a substantially flat overlapping area comprising a metal, at least one absorber, at least one conduit, at least one top transparent wall, at least one bottom wall, and a metal coating comprising a plasma spread copper layer and tin cover layer at least at a portion of a periphery edge of the transparent wall;
providing a metal ribbon soldered to said metal coating with a second soft soldered portion at an outside edge of the ribbon at said periphery edge of the wall, said metal ribbon comprising at least one of the elements selected from the group consisting of lead and copper;
providing a getter;
fitting at least one conduit in thermally associated fashion to the at least one absorber, and into connection ports in the holding structure;
connecting ends of the conduit to the connecting ports;
fitting the transparent wall and bottom wall onto the holding structure;
soldering said metal ribbon to the holding structure overlapping area comprising said metal with a first soft soldered portion at an opposite inside edge of said soft metal ribbon;
evacuating the solar panel by use of at least one external pump; and
heating the flat panel solar collector for a period of time to provide a sufficient outgassing of the collector and heating the flat panel solar collector in order to activate the getter.

* * * * *